United States Patent
Hu

(10) Patent No.: US 8,205,104 B2
(45) Date of Patent: Jun. 19, 2012

(54) SOUTH BRIDGE CONFIGURED TO DETECT A HIGH LEVEL VOLTAGE FROM A SUPER I/O CHIP WHEN THE COMPUTER IS SHUT DOWN

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 367 days.

(21) Appl. No.: 12/634,575

(22) Filed: Dec. 9, 2009

(65) Prior Publication Data

US 2011/0055600 A1    Mar. 3, 2011

(30) Foreign Application Priority Data

Aug. 27, 2009 (CN) .................... 2009 2 0308977 U

(51) Int. Cl.
 *G06F 1/00* (2006.01)
 *H03K 17/60* (2006.01)
 *H03K 17/72* (2006.01)
(52) U.S. Cl. ........ 713/300; 713/310; 713/323; 327/431; 327/434
(58) Field of Classification Search .................. 713/300, 713/310, 323; 327/431, 434
See application file for complete search history.

(56) References Cited

U.S. PATENT DOCUMENTS

| | | | | |
|---|---|---|---|---|
| 7,930,570 | B2 * | 4/2011 | Zou et al. | 713/300 |
| 2008/0148086 | A1 * | 6/2008 | Zhang | 713/500 |
| 2009/0259859 | A1 * | 10/2009 | Zou et al. | 713/300 |
| 2010/0250983 | A1 * | 9/2010 | Wang | 713/320 |

* cited by examiner

*Primary Examiner* — Vincent Tran
(74) *Attorney, Agent, or Firm* — Altis Law Group, Inc.

(57) ABSTRACT

A power supply control circuit for a motherboard of a computer is provided. The power supply control circuit includes a south bridge chip and a voltage output control circuit connected to the south bridge chip. The south bridge chip includes a control pin and a detecting pin. The voltage output control circuit has a voltage input terminal and a voltage output terminal. The voltage output control circuit includes a transistor connected to the voltage input terminal and also connected to the voltage output terminal via a switch component. The voltage output terminal is connected to the detecting pin of the south bridge chip via a super I/O chip. The transistor is capable of controlling the switch component to transmit a high level voltage to the super I/O chip when the computer is shut down. A method is also provided.

13 Claims, 3 Drawing Sheets

```
┌─────────────────────────────────────────────────────┐
│ Providing a computer motherboard comprising of a control │
│ terminal, a south bridge chip with a detecting terminal, a first │
│ motherboard power source, a standby high level power │
│ source; a transistor; a switch component; and a super I/O chip │
└─────────────────────────────────────────────────────┘
                          ↓
┌─────────────────────────────────────────────────────┐
│ Connecting the control terminal to a base terminal of the │
│ transistor │
└─────────────────────────────────────────────────────┘
                          ↓
┌─────────────────────────────────────────────────────┐
│ Coupling a collecting terminal of the transistor to the first │
│ motherboard power source and connecting the collecting │
│ terminal to a switch component │
└─────────────────────────────────────────────────────┘
                          ↓
┌─────────────────────────────────────────────────────┐
│ Connecting the switch component to the standby high │
│ level power source and connecting an output terminal │
│ of the switch component to the super I/O chip │
└─────────────────────────────────────────────────────┘
                          ↓
┌─────────────────────────────────────────────────────┐
│ Coupling the super I/O chip to the detecting terminal of │
│ the south bridge chip of the computer │
└─────────────────────────────────────────────────────┘
                          ↓
┌─────────────────────────────────────────────────────┐
│ The transistor outputs the low level voltage source to the │
│ switch component to ensure the switch component to be │
│ always opened and sends the standby high level power │
│ source to the super I/O chip │
└─────────────────────────────────────────────────────┘
```

FIG. 3

SOUTH BRIDGE CONFIGURED TO DETECT A HIGH LEVEL VOLTAGE FROM A SUPER I/O CHIP WHEN THE COMPUTER IS SHUT DOWN

BACKGROUND

1. Technical Field

The present disclosure relates to power supply control circuits and method, and particularly to a power supply circuit and method capable of controlling a computer to be shut down as expected.

2. Description of Related Art

In computer systems, a voltage output control circuit is generally arranged on a computer motherboard and connected to the south bridge chip. The south bridge chip includes a control terminal and a detecting terminal. The control terminal provides a control voltage for the voltage output control circuit. The detecting terminal detects a voltage signal from the voltage output control circuit so as to control the south bridge chip. When the computer is shut down, if the voltage signal from the voltage output circuit is at a low level, the south bridge chip will be wakened, and the computer will be powered on. Thus, the computer cannot be shut down as expected.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 3 is a flow chart of a method for controlling a computer to be shut down as expected via the power supply control circuit.

DETAILED DESCRIPTION

Figure 1:
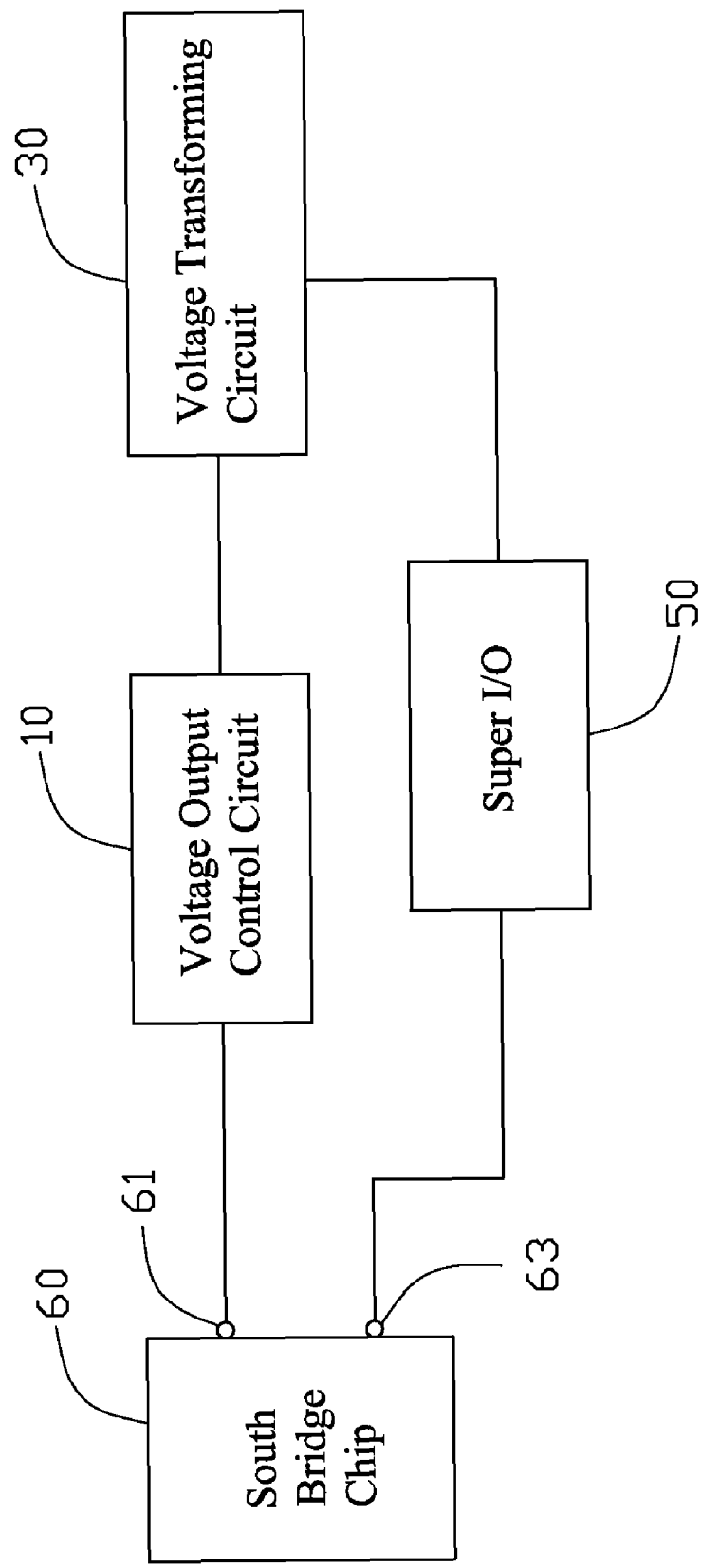
FIG. 1 is a diagram of an embodiment of a power supply control circuit for an audio codec chip.
Figure 2:
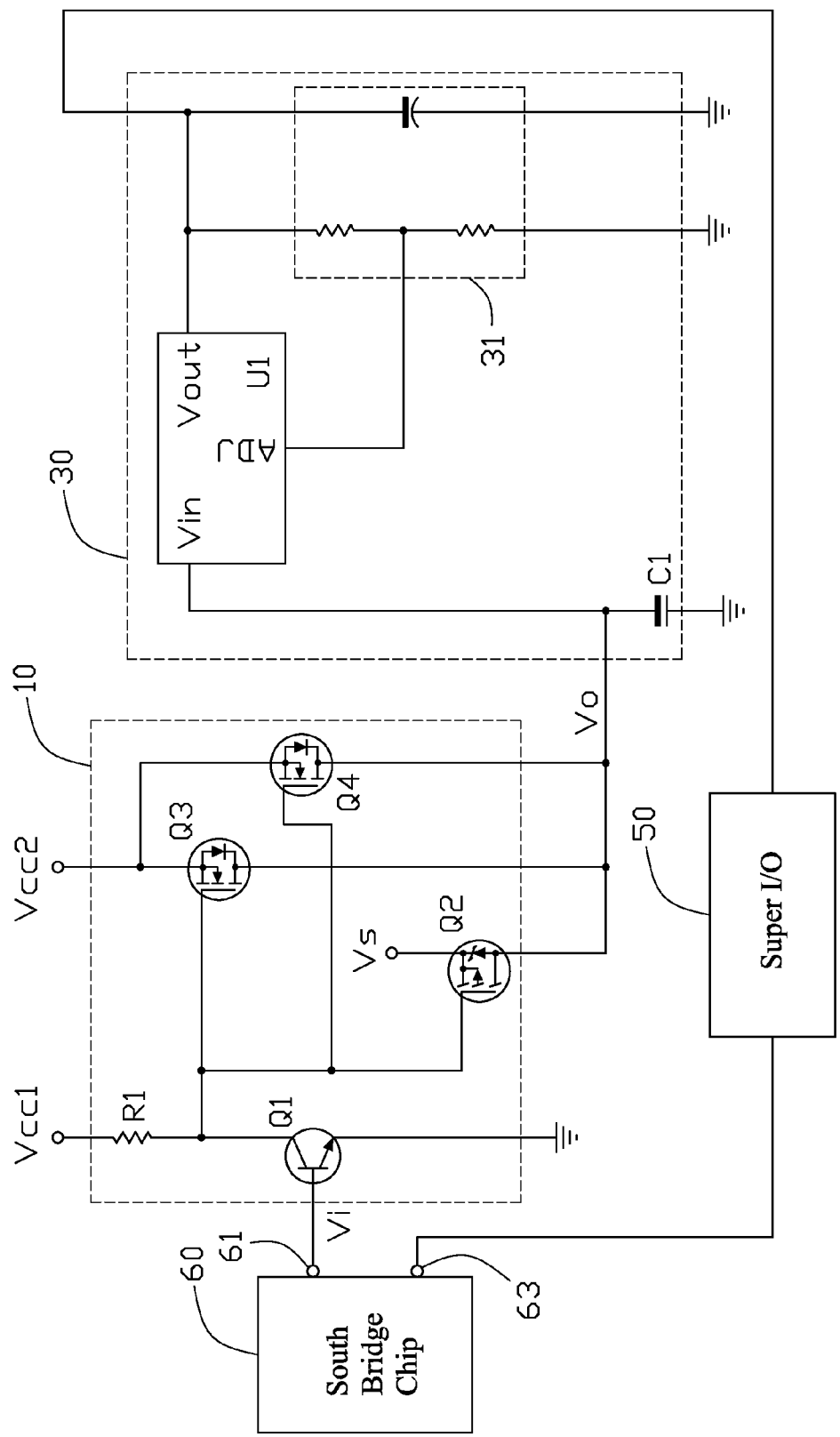
FIG. 2 is a circuit diagram of the power supply control circuit of FIG. 1.

Referring to FIGS. 1 and 2, an embodiment of a power supply control circuit for a motherboard of a computer is capable of being shut down in a normal manner. The power supply control circuit includes a voltage output control circuit 10, a voltage transforming circuit 30, a super I/O chip 50, and a south bridge chip 60. The south bridge chip 60 includes a control pin 61 and a detecting pin 63.

The voltage output control circuit 10 includes a voltage input terminal Vi coupled to the control pin 61 of the south bridge chip 60, a first motherboard power source terminal Vcc1 configured to provide a first motherboard power source, a voltage output terminal Vo, a transistor Q1, and a switch component Q2. In one embodiment, the transistor Q1 is NPN type, and the switch component Q2 is a P-channel metal oxide semiconductor field effect transistor (MOSFET). The base terminal of the transistor Q1 is connected to the voltage input terminal Vi of the voltage output control circuit 10. The collector terminal of the transistor Q1 is connected to the grid terminal of the P-channel MOSFET Q2 and connected to the first motherboard power source terminal Vcc1 via a resistor R1. The emitter terminal of the transistor Q1 is grounded. The source terminal of the P-channel MOSFET Q2 is connected to a standby motherboard power source terminal Vs. The drain terminal of the P-channel MOSFET Q2 is connected to the voltage output terminal Vo. In one embodiment, the first motherboard power source terminal Vcc1 provides a 12 volt (V) voltage source. The standby motherboard power source provides a 5V voltage source. The voltage output control circuit 10 further includes two N-channel MOSFETs Q3 and Q4. The grid terminals of the N-channel MOSFETs Q3 and Q4 are connected to the collector terminal of the transistor Q1; the source terminals are connected to a second motherboard power source terminal Vcc2, which is capable of providing a 5V voltage source; and the drain terminals are connected to the voltage output terminal Vo.

The voltage transforming circuit 30 includes a transformer U1. The transformer U1 includes an input terminal Vin and an output terminal Vout. The input terminal Vin is coupled to the voltage output terminal Vo of the voltage output control circuit 10, and also grounded via a capacitor C1. The voltage output terminal Vo of the voltage output control circuit 10 outputs the voltage from the switch component Q2 to the input terminal Vin of the transformer U1. After the output voltage from the switch component Q2 is transformed by the transformer U1, the output terminal Vout of the voltage transforming circuit output the transformed voltage to the Super I/O chip 50 via a RC filter circuit 31. The Super I/O chip 50 is connected to the detecting pin 63 of the south bridge chip 60.

Referring also to FIG. 3, a method in accordance with one embodiment is also provided for controlling a computer to be shut down in a normal manner. When the computer is shut down, the power source provided by the first motherboard power source terminal Vcc1 gradually decreases to 0V from 12V via a capacitor of a power supply (now shown) for the computer; and the voltage source provided by the second motherboard power source terminal Vcc1 disappears. The control pin 61 of the south bridge chip 60 outputs a 1.44V voltage source (low level) signal to the voltage input terminal of the voltage output control circuit 10, that is, the base terminal of the transistor Q1 receives a 1.44V input voltage. The voltage difference between the base terminal and the emitter terminal of the transistor Q1 is greater than 0.7V so that the transistor Q1 is opened. The collector terminal output a low level voltage to the grid terminals of the P-channel MOSFET Q2 and the N-channel MOSFETs Q3 and Q4. Thus, the P-channel MOSFET Q2 is opened. Meanwhile, because the power source provided by the second motherboard power source terminal Vcc2 is no longer connected, the N-channel MOSFETs are broken. The drain terminal of the P-channel MOSFET Q2 outputs a 5V voltage (high level) from the standby motherboard power source terminal Vs to the input terminal Vin of the voltage transforming circuit 30. The voltage transforming circuit 30 transforms the 5V voltage to a 3.3V high level voltage and output the 3.3V voltage to the Super I/O chip 50. When the detecting pin 63 of the south bridge chip 60 detects the 3.3V high level voltage, the computer is shut down.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A power supply control circuit for a computer, comprising:
   a south bridge chip having a control pin and a detecting pin; and
   a voltage output control circuit connected to the south bridge chip, the voltage output control circuit having a voltage input terminal and a voltage output terminal; the voltage output control circuit comprising a transistor connected to the voltage input terminal and to the voltage output terminal via a switch component, and the voltage output terminal is connected to the detecting pin of the south bridge chip via a super I/O chip;
   wherein the transistor is capable of causing the switch component to transmit a high level voltage to the super I/O chip when the computer is shut down.

2. The power supply control circuit of claim 1, wherein the transistor is NPN type; a base pin of the triode is connected to the control pin of the south bridge chip, a collector pin of the triode is connected to the switch component and a first motherboard power source terminal via an inductance, and an emitter pin of the triode is grounded.

3. The power supply control circuit of claim 2, wherein the switch component is a P-channel metal oxide semiconductor field effect transistor (MOSFET); a grid terminal of the P-channel MOSFET is connected to the collecting pin of the transistor, a source terminal of the P-channel MOSFET is connected to a standby power source terminal, and the drain terminal of the P-channel MOSFET is connected to the first power source.

4. The power supply control circuit of claim 3, wherein the standby power source is capable of providing a 5V voltage source.

5. The power supply control circuit of claim 2, wherein the first motherboard power source terminal is capable of providing a 12V voltage source.

6. The power supply control circuit of claim 1, wherein the voltage output control circuit further comprises a voltage transforming circuit connected between the voltage output terminal and the super I/O chip.

7. The power supply control circuit of claim 6, wherein the voltage from the voltage output terminal is 5V when the switch components is turned on; and the voltage transforming circuit is capable of transforming the 5V voltage to a 3.3V voltage.

8. A method for controlling a computer to be shut down in a normal manner when a power source for the computer is cut off, the method comprising:
   providing a computer motherboard comprising of a control terminal, a south bridge chip with a detecting terminal, a first motherboard power source, a standby high level power source; a transistor; a switch component; and a super I/O chip;
   connecting the control terminal to a base terminal of the transistor;
   coupling a collecting terminal of the transistor to the first motherboard power source and connecting the collecting terminal to a switch component;
   connecting the switch component to the standby high level power source and connecting an output terminal of the switch component to the super I/O chip; and
   coupling the super I/O chip to the detecting terminal of the south bridge chip of the computer;
   wherein the control terminal outputs a low level voltage source to the base terminal of the transistor, and the transistor outputs the low level voltage source to the switch component so as to ensure the switch component to be always opened and sends the standby high level power source to the super I/O chip.

9. The method of claim 8, wherein the switch component is provided as a P-channel metal oxide semiconductor field effect transistor (MOSFET), with a grid terminal of the P-channel MOSFET connected to the collecting pin of the transistor, a source terminal of the P-channel MOSFET connected to a standby power source terminal, and the drain terminal of the P-channel MOSFET connected to the first power source.

10. The method of claim 8, wherein the first high level power source terminal outputs a 12V voltage source to the collecting terminal of the transistor.

11. The method of claim 8, wherein the standby high level power source outputs a 5V voltage source to the switch component.

12. The method of claim 11, further comprising connecting a voltage transforming circuit between the switch component and the super I/O chip.

13. The method of claim 12, wherein the voltage transforming circuit transforms the 5V voltage source to a 3.3V voltage source and sends to the super I/O chip.

* * * * *